US012679047B1

(12) United States Patent
Stloukal et al.

(10) Patent No.: US 12,679,047 B1
(45) Date of Patent: Jul. 14, 2026

(54) MULTILAYERED FIRE-RESISTANT POLYMER COMPOSITE AND METHOD FOR MAKING SAME

(71) Applicant: XERIANT, INC., Boca Raton, FL (US)

(72) Inventors: Martin Stloukal, Dubnica and Vahom (SK); Scott Duffy, Boca Raton, FL (US)

(73) Assignee: XERIANT, INC., Boca Raton, FL (US)

( * ) Notice: Subject to any disclaimer, the term of this patent is extended or adjusted under 35 U.S.C. 154(b) by 59 days.

(21) Appl. No.: 18/623,359

(22) Filed: Apr. 1, 2024

Related U.S. Application Data

(60) Provisional application No. 63/456,119, filed on Mar. 31, 2023.

(51) Int. Cl.
| | |
|---|---|
| *B29C 69/02* | (2006.01) |
| *B29C 35/02* | (2006.01) |
| *B29K 101/12* | (2006.01) |
| *B29K 105/00* | (2006.01) |
| *B29K 105/08* | (2006.01) |

(52) U.S. Cl.
CPC .......... *B29C 69/02* (2013.01); *B29C 35/0238* (2013.01); *B29C 35/0288* (2013.01); *B29K 2101/12* (2013.01); *B29K 2105/0026* (2013.01); *B29K 2105/08* (2013.01)

(58) Field of Classification Search
CPC . B29C 69/02; B29C 35/0238; B29C 35/0288; B29C 41/12; B29C 44/381; B29C 44/383; B29C 44/467; B29C 44/485; B29C 49/4247; B29C 39/405; B29C 43/006; B29C 2043/147; B29C 43/203; B29C 43/206; B29C 43/34; B29C 43/44
See application file for complete search history.

(56) References Cited

U.S. PATENT DOCUMENTS

2008/0064794 A1 * 3/2008 Murdock ............ B29B 17/0042
241/23

FOREIGN PATENT DOCUMENTS

CN 101637956 * 2/2010

* cited by examiner

*Primary Examiner* — Stella K Yi
(74) *Attorney, Agent, or Firm* — POLLEY IP LAW, P.A.

(57) ABSTRACT
A versatile, multilayered composite construction material containing fiber-reinforced thermoplastic or thermosetting polymers treated with a non-toxic fire retardant and method of making same. Where used in the construction industry, the produced multilayered fire-resistant thermoplastic and fiber composite material can be formed or shaped into various construction products of different thicknesses and dimensions, such as, without limitation, interior wall panels, sheathing and structural boards.

28 Claims, 1 Drawing Sheet

Three-layered Composite Material – Cross Section

Boundary Layer ③

② Base Layer

Boundary Layer ①

Triple Layering Architecture Example 1

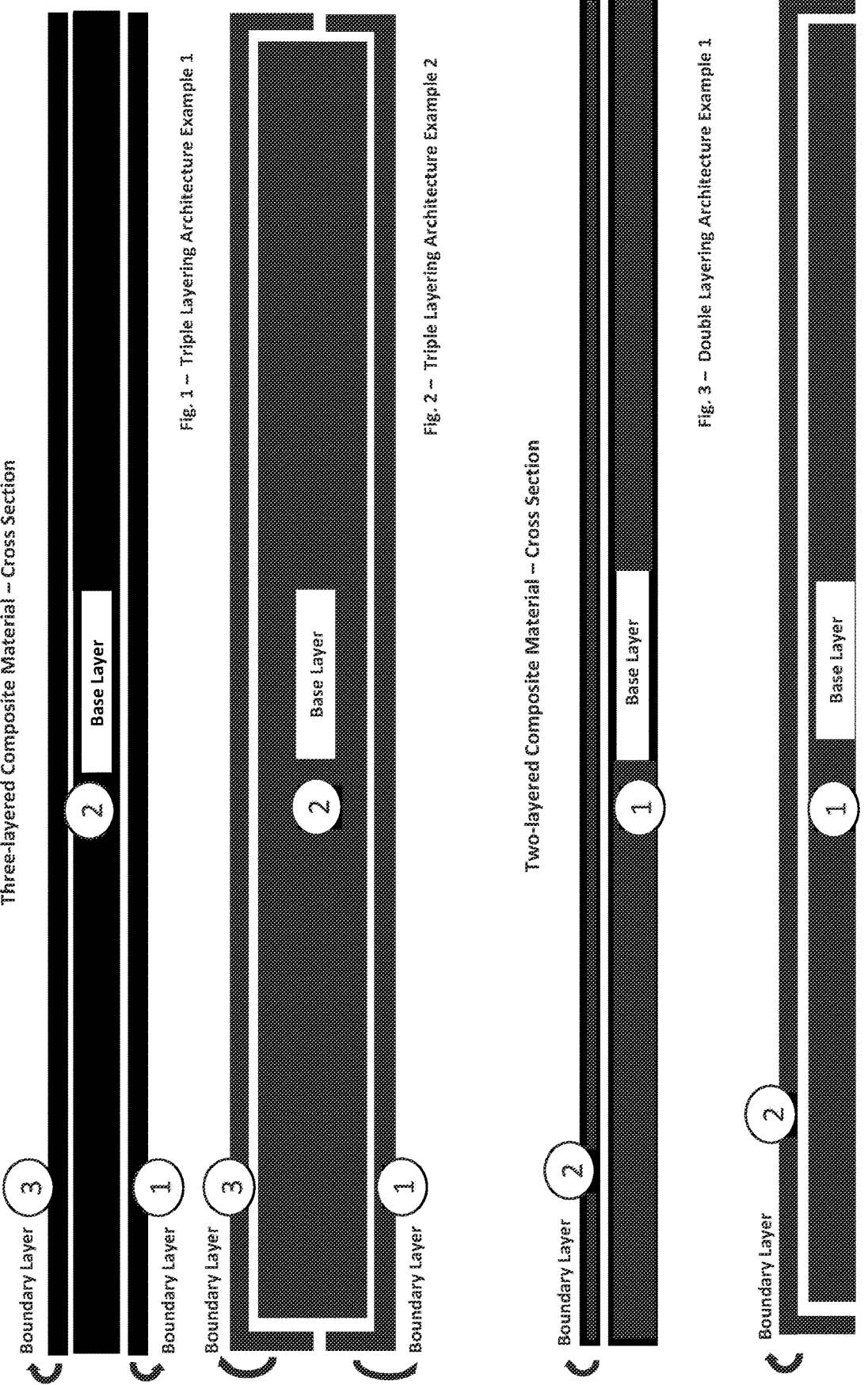
Fig. 1 — Triple Layering Architecture Example 1
Fig. 2 — Triple Layering Architecture Example 2
Fig. 3 — Double Layering Architecture Example 1
Fig. 4 — Double Layering Architecture Example 2

MULTILAYERED FIRE-RESISTANT POLYMER COMPOSITE AND METHOD FOR MAKING SAME

This application claims the benefit of and priority to U.S. Application Ser. No. 63/456,119, filed Mar. 31, 2023, which application is incorporated by reference for all purposes.

1. FIELD OF THE DISCLOSURE

The disclosure relates generally to construction industry composites and more specifically to a novel polymer composite.

2. BACKGROUND

The construction industry is transitioning to more efficient, modular, resilient and sustainable building systems with faster completion times at lower costs, adopting the latest advancements in digital modeling, project management, design standardization and composite materials. Market factors supporting the implementation of advanced building techniques and composite materials include the worldwide shortage in affordable housing, the unsustainable plastic and cardboard waste accumulating in landfills, rising energy rates, the banning of toxic chemicals, and the increasing property insurance premiums particularly in flood and fire prone regions.

Thermoplastic and thermosetting polymer composites represent an alternative to many of the existing building materials such as drywall, plywood, OSB, MgO board, lumber and metals used in the construction of walls, ceilings, subflooring, flooring, framing, siding, roofing and decking, and offer improved durability, safety and structural performance. These plastic-based composites have an inherent resistance to water, mold and insects, have excellent insulating properties, are formable when heated and can be lightweight. A further benefit of polymer composites is that they can be produced from recycled plastic and cellulose fiber waste.

Despite advances in polymer chemistry, composite manufacturing processes and the discovery of new applications for polymer composites in construction, gypsum and wood continue to dominate the industry. For over a century, the construction industry has been using gypsum drywall as part of partitioning assemblies for interior walls and ceilings of residential and commercial buildings. Gypsum drywall is by far the most common building material throughout the world for lining interior spaces. When exposed to fire and extreme temperatures for extended periods of time, gypsum drywall shrinks, cracks, crumbles and eventually burns, and can compromise the entire assembly leading to catastrophic damage to the integrity of the structure. In addition, water and moisture can cause gypsum drywall to become permanently soft, causing warping, buckling and discoloration, requiring replacement. During handling and after installation, when stressed or impacted, it is susceptible to puncture and abrasion. As an environmental hazard, gypsum drywall waste constitutes a large percentage of the construction debris found in landfills.

Wood is one of the oldest construction materials and has become ubiquitous in framing, sheathing and trim applications. For framing, dimensional lumber is commonly used in floor, wall and roof assemblies, which create the solid foundational structure. According to the National Association of Home Builders, 90% of homes built in 2019 were wood-framed. Engineered wood products like plywood and OSB attach to the framing to form a weather barrier while also contributing to structural stability. When subjected to fire or extreme heat, wood products are vulnerable to combustion, degradation and decomposition, which can cause significant damage and even structural collapse. Adhesives binding many engineered wood products often contain chemicals that emit toxic gases when burned. Wood has a limited lifespan in certain applications and can be penetrated by moisture and water, causing swelling, deterioration and mold formation, requiring replacement. Wood can also be impacted by insects, such as termites, carpenter ants and wood boring beetles. The growing demand for wood products is resulting in surging prices and environmental issues such as deforestation, which is a significant problem throughout many parts of the world.

Many of the most urgent environmental, social and economic concerns associated with housing and construction can be addressed through recent technological advances in building systems and composite materials and further addressed in a novel manner by the below disclosed novel polymer composite material described herein. The well-documented drawbacks of gypsum drywall and wood, the two most prevalent construction materials, present a market opportunity for the novel multilayered polymer composites disclosed herein, as they can be manufactured at scale, competitively priced and customized for different applications. Factors like wide availability of inexpensive input materials and low production costs can mitigate many of the previous barriers to entry and allow the disclosed novel multilayered polymer composites to effectively compete in the market. Thus, it is to reducing the above-noted limitations found with gypsum drywall and wood, as well as addressing other issues in the construction industry, that the below disclosed novel polymer composite material is directed to.

SUMMARY OF THE DISCLOSURE

A novel high-strength, fire- and water-resistant polymer composite material is described and disclosed herein, which can be sourced from recycled waste, can itself be recyclable, and can be layered and enhanced with varying input components and concentrations of additives such as fire retardants, which constitutes a significant advancement in building materials and composites for the future of the construction industry.

BRIEF DESCRIPTION OF THE DRAWINGS

FIG. 1 is a cross-sectional view of a non-limiting embodiment for a three-layered composite material whereby the base material can be covered with a boundary layer on two sides in accordance with the present disclosure;

FIG. 2 is a cross-sectional view of a non-limiting embodiment for a three-layered composite material whereby the base material can be covered with a boundary layer on four sides in accordance with the present disclosure;

FIG. 3 is a cross-sectional view of a non-limiting embodiment for a two-layered composite material whereby the base material can be covered with a boundary layer on one side in accordance with the present disclosure; and FIG. 4 is a cross-sectional view of a non-limiting embodiment for a two-layered composite material whereby the base material can be covered with a boundary layer on three sides in accordance with the present disclosure.

DETAILED DESCRIPTION

A versatile, multilayered fire-resistant polymer composite and method for making such composite is described and disclosed below. In one non-limiting embodiment, the composite can be used as a construction material and can contain fiber-reinforced polymers preferably treated with a non-toxic fire retardant. The multilayered fire-resistant polymer and fiber composite material can be formed or shaped into various construction products (as well as other products and/or applications) of different thicknesses and dimensions, including, but not limited to, interior wall panels, sheathing and structural boards and all sizes, shapes and configurations are considered within the scope of the disclosure.

As seen in the drawing figures, the layered architecture of the composite material preferably can consist of a base or core layer, preferably accounting for the bulk of the volume, and preferably either one or two thinner boundary layers preferably providing the highest concentration of protective fire resistance properties and smooth finished surfaces. Though not shown in the drawings, for certain intended uses additional layers or materials may be added to the composite and are considered within the scope of the disclosure and the order of the layers (i.e. base layer, bondary layer and additional layer in between in one non-limiting example) is not considered limited to any particular order and various layer orders can be used or selected and all are considered within the scope of the disclosure . . .

The processing of the input components for the base and boundary layers can involve grinding and homogenizing the preferred plastic and fiber materials, using industrial shredders and specialized integration machinery, including, without limitation, extruders and pelletizers, which reduce the materials into smaller fragments or particles and preferably can thermally combine them prior to pressing or forming. Because the boundary layers preferably use more refined input materials to enable smooth surfaces, the plastic and fiber input fragments can be smaller for the boundary layers than those used for the base layer, although the base and boundary layers may contain the same input materials and is also considered within the scope of the disclosure. Through screening or adjusting the cutting plates on certain machinery, varying ranges of particle sizes can be produced and separated for each set of input components. During the integration process for the base and boundary layer input materials, a fire retardant can preferably be added to the mix, along with potentially other additives. Additives, including fire retardants, may also be introduced separately at various stages in the process as a liquid, powder or pelletized masterbatch, depending on the production method or equipment configuration. The ratios and quality of input materials can be consistent and specified for each layer, which can be produced with different thicknesses. In some applications, a fiber reinforcement material may not be necessary for the boundary layers, thereby altering the composition of the layer and the above-mentioned integration step. The plastic and fiber input components may be derived from either new or recycled sources and can be available in pelletized form, either with or without additives such as fire retardants, which potentially will reduce the processing steps. An industrial dryer may be used to remove moisture from the input materials prior to entering the production line.

In addition to preferably having smooth surfaces and higher concentrations of fire retardants (on in lieu of— though not preferred), the boundary layers may be formulated with additives, which can either be premixed or separately infused, to improve performance, modify color, reduce weight, or alter rheological properties and cure rates. Similarly, the base layer material may be formulated with various agents to change its behavior and characteristics during processing and in the final product. Weight or density reduction for both the base and boundary layers can involve creating microcellular structures within the material, called foaming, using chemical, physical or mechanical techniques. The forming method is determined by the type of production equipment and desired cell morphology, which can include cell size and dispersion within the polymer matrix.

For certain production methods, the particle size of the shredded input materials for the base layer can preferably range from 20 or about 20 millimeters to 25 or about 25 millimeters, though it is possible for certain uses, smaller or larger dimensions outside of the preferred range may be needed or used and are also considered within the scope of the disclosure. The initial shredding of plastic and fiber input components can be a high-volume operation and supply the preferred particle size for the base layer. Production output may be slowed if the particle size for the base layer material is required to be below 20 or about 20 millimeters due to the protracted duration of this stage in the process. For the boundary layers, the input materials can be more refined, with particle sizes preferably ranging from 2 or about 2 millimeters to 3 or about 3 millimeters, to allow for a smooth outer finish. However, like the base layer, it is possible for certain uses, smaller or larger dimensions outside of the preferred range may be needed or used and are also considered within the scope of the disclosure.

The preferred plastics can include low density polyethylene, high density polyethylene, polypropylene and polystyrene, although other types of thermoplastics and thermosets such as epoxies or polyester may also be used, depending on the production process and desired properties, and are also considered within the scope of the disclosure. The fiber can be preferably cellulose-based, such as cardboard, wood and hemp, or made from another type of reinforcing material such as glass or basalt depending on the application's requirements.

Prior to beginning the production method for the novel composite, the two preferred types of input materials, for the base and boundary layers, can be separately stored and positioned in a prearranged sequence for the hopper, conveyor, spreader or other device that may be used prior to pressing or forming, which produces the final product. Depending on the production method and equipment used, additives may be pre-mixed or compounded with the plastic and fiber materials, or introduced later in the process, which may reduce fatiguing or premature triggering due to heat or stress.

In a compression molding production method, the amount and rate of flow of the input materials to the conveyor surface at each stage of the spreading process can be calculated based on the multilayered architecture of the composite. There may be additional layers comprising other types of input material which would be similarly stored and positioned as part of a feeding system for the production line. For a three-layered composite preferably a series of three automated spreading machines can be stationed at the start of the production line. The first spreading machine can transfer and uniformly distribute the input material for the bottom boundary layer across a continuous sheet of paper or another material which covers the conveyor surface. Paper fed on rollers is preferably used to move the input material and to prevent the heated plastic from adhering to the platen during the heat pressing stage in the production line. As the input material for the bottom layer moves down the line, a second spreading machine discharges and evenly distributes the base layer input material over the boundary layer material. The input materials move down the line to a third spreading machine, which adds a top boundary layer in the same manner. A set of rollers applying light pressure or other leveling mechanisms may be used in conjunction with the spreading machines to even out the input materials. The three stacked layers of input materials can move to a hot press, where they can be melted at a temperature of preferably between 190 or about 190 and 200 or about 200 degrees Celsius (which can be considered a preferred, though not limiting, maximum temperature range) and compressed. The multilayered composite formed by heat compression then can move along the conveyor to a cold press, where it is cooled, and a curing station where it is put on a rack. At the end of the process, there may be finishing modifications such as, but not limited to, edge trimming, coatings or chemical agents as specified by the application.

An alternate stratification process to form multilayered composites using compression molding can preferably have two or three sets of material spreaders, hot presses and cold presses in the production line, as determined by the product's layering specifications. However, if the composite comprises more than three layers, additional spreaders, hot presses and cold presses may be used and are also considered within the scope of the disclosure. In the initial stage of the production line a spreader can preferably be used to place the input material for the bottom boundary layer uniformly on the conveyor surface, which is moved to a hot press where it forms a solid layer, and then to a cold press, where it is cooled. The solid boundary layer moves to the next stage where a second spreader can be preferably used to distribute the base layer input material on top of the solid bottom layer. The next set of heat and cold presses form a solid base layer, the second layer of the composite. In the third stage, a spreader can be preferably used to place the second boundary layer input material over the two formed layers to create the final product. To add more layers, the process may be repeated with subsequent sets of spreaders and presses along the production line. At each stage of heat pressing, the input materials can be evenly and uniformly spread on the platen, melted at a temperature of preferably between 190 or about 190 and 200 or about 200 degrees Celsius (which can be considered a preferred, though not limiting, maximum temperature range) and compressed.

As an alternative to hydraulic compression molding, which utilizes hot and cold presses sequenced along a production line, low-pressure co-injection molding machinery may be used to form the layered composite product. Using this production method, the boundary and base input materials, which can be preferably in pelletized granules (though not limiting), can be melted separately using two extruders and formed by using multiple injection feeds or nozzles to deposit and layer each material in the mold cavity in an additive process. Under high pressure, the boundary layer material can be injected into the mold first, forming the outer layer, followed by the base or core layer material being injected. A third layer composed of the boundary layer material may be added subsequently, depending on the application. The final molded product derived from the co-injection molding process may be trimmed or undergo additional modifications as needed.

Though a primary use for the novel composite is in the construction/building industry, such use is not considered limiting, and the novel composite may be used in various now known and later developed applications within the construction/building industry as well as outside of the construction/building industry and all uses are considered within the scope of the disclosure.

All measurements, dimensions, amounts, values, sizes, shapes, percentages, materials, temperatures, configurations, uses, components, orientations, etc. discussed above or shown in the drawing figures are merely by way of example and are not considered limiting and other measurements, dimensions, amounts, values, sizes, shapes, percentages, materials, temperatures, configurations, components, orientations etc. can be chosen and used and all are considered within the scope of the invention.

Furthermore, certain features discussed for one embodiment of the novel composite or method can also be used with another of the above discussed embodiments.

While the composite and method of making has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, an extensive array of alternatives, suggested by the teachings herein, can be practiced without departing from the spirit of the disclosure, and rights to such alternatives are particularly reserved and considered within the scope of the present disclosure.

What is claimed is:

1. A method for producing a multilayered composite, comprising:
   a. providing a plurality of input materials for a base layer and at least one boundary layer; wherein the base layer comprises polymer and fiber particles having a first average particle size, and the boundary layer comprises polymer particles having a second average particle size smaller than the first average particle size; wherein a first boundary layer of the at least one boundary including a fire-retardant additive and the first boundary layer contains a higher concentration of the fire-retardant additive as compared to the base layer;
   b. using a first spreading machine to uniformly distribute the material for a first of the at least one boundary layer onto a conveyor surface;
   c. using a second spread machine to uniformly distribute the material for the base layer over the material for the first of the at least one boundary layer; and
   d. fusing or forming the first boundary layer and the base layer together using heat and pressure.

2. The method for producing a multilayered composite of claim 1, further comprising curing the fused or formed together first boundary layer and base layer.

3. The method for producing a multilayered composite of claim 2, further comprising trimming the cured fused or formed together first boundary layer and base layer.

4. The method of claim 1, further comprising sorting and separately storing the plurality of input materials for the base and at least one boundary layers prior to beginning to produce the multilayered composite.

5. The method of claim 1, further comprising positioning the plurality of input materials for the base and at least one boundary layers in a prearranged loading sequence to facilitate a use of a loading system.

6. The method of claim 1, further comprising uniformly spreading the plurality of input materials using a spreading machine at each stage prior to heat pressing.

7. The method of claim 6, further comprising melting the plurality of input materials at a temperature of preferably between about 190 and about 200 degrees Celsius to form melted input materials.

8. The method of claim 7, wherein the melted plurality of input materials are compressed.

9. The method of claim 1, wherein the plurality of input materials comprise a thermoplastic or thermosetting polymer material and fire-retardant material.

10. The method of claim 9, wherein the plurality of input materials further comprise a fiber material.

11. A method for producing a multilayered composite, comprising:

a. forming a first solid boundary layer by spreading a plurality of boundary layer materials having a boundary layer fire-retardant concentration and fusing the plurality of boundary layer materials using heat and pressure;

b. depositing a plurality of base layer materials having a base layer fire-retardant concentration, the base layer fire-retardant concentration being lower than the boundary layer fire-retardant concentration;

c. applying heat and pressure to fuse the plurality of base layer materials to the first solid boundary layer to form the multilayered composite; and d. cooling the multilayered composite under compression to maintain a stratified structure.

12. The method for producing a multilayered composite of claim 11, further comprising curing the fused together layers.

13. The method for producing a multilayered composite of claim 12, further comprising trimming the cured fused together layers.

14. The method of claim 11, further comprising sorting and separately storing the plurality of input materials for the base and boundary layers prior to beginning to produce the multilayered composite.

15. The method of claim 11, further comprising positioning the plurality of input materials for the base and boundary layers in a prearranged loading sequence to facilitate the use of a loading system.

16. The method of claim 11, further comprising uniformly spreading the plurality input materials on a platen at each stage of heat pressing.

17. The method of claim 16, further comprising melting the plurality of input materials at a temperature of preferably between about 190 and about 200 degrees Celsius.

18. The method of claim 17, wherein the melted plurality of input materials are compressed.

19. The method of claim 11, wherein the plurality of input materials comprise a thermoplastic or thermosetting polymer composite material and fire-retardant material.

20. The method of claim 19, wherein the plurality of input materials further comprise a fiber material.

21. A method for producing a multilayered composite, comprising:

a. providing a plurality of input base layer materials for a base layer of the multilayered composite, the plurality of input materials having a first fire-retardant concentration;

b. providing a plurality of boundary layer materials for a boundary layer of the multilayered composite, the plurality of boundary layer materials having a second fire-retardant concentration;

c. depositing the plurality of boundary layer materials into a mold for creating an outer layer of the multilayered composite;

d. depositing the plurality of base layer materials over the plurality of boundary layer material within the mold; and e. fusing the plurality of base layer materials and the plurality of boundary layer materials together using heat and/or pressure;

wherein the second fire-retardant concentration is higher than the first fire-retardant concentration.

22. The method for producing a multilayered composite of claim 21, further comprising curing the fused together layers.

23. The method for producing a multilayered composite of claim 22, further comprising trimming the cured fused together layers.

24. The method of claim 21, further comprising separately storing the plurality of input materials for the base and boundary layers prior to beginning to produce producing the multilayered composite.

25. The method of claim 21, further comprising positioning the plurality of input materials for the base and boundary layers in a prearranged loading sequence to facilitate layering and bonding of the plurality of input materials.

26. The method of claim 21, further comprising and uniformly molding melted and/or compressed input materials in layers within the mold cavity.

27. The method of claim 21, wherein the plurality of input materials comprise a thermoplastic material and fire-retardant material.

28. The method of claim 27, wherein the plurality of input materials further comprise a fiber material.

* * * * *